United States Patent
Shioji

(10) Patent No.: US 6,741,280 B1
(45) Date of Patent: May 25, 2004

(54) DIGITAL CAMERA HAVING REPRODUCTION ZOOM MODE

(75) Inventor: Masahiro Shioji, Neyagawa (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/273,523

(22) Filed: Mar. 22, 1999

(30) Foreign Application Priority Data

Mar. 24, 1998 (JP) .......................................... 10-075637

(51) Int. Cl.⁷ .............................................. H04N 5/262
(52) U.S. Cl. ................................................. 348/240.99
(58) Field of Search ....................... 348/240.99, 240.1, 348/240.2

(56) References Cited

U.S. PATENT DOCUMENTS 5,838,370 A * 11/1998 Kaji ........................... 348/240

FOREIGN PATENT DOCUMENTS

| JP | 03129975 A | * | 3/1991 |
| JP | 3-129975 | | 6/1991 |
| JP | 4-326262 | | 11/1992 |
| JP | 7-283990 | | 10/1995 |
| JP | 9-326992 | | 12/1997 |

* cited by examiner

Primary Examiner—Wendy R. Garber
Assistant Examiner—Rashawn N. Tillery
(74) Attorney, Agent, or Firm—Armstrong, Kratz, Quintos, Hanson & Brooks, LLP

(57) ABSTRACT

In a digital camera, a reproduction zoom function is selected and set, and a central portion of a reproduced image displayed on an LCD is enlarged and displayed on the full screen of the LCD. Thereafter, the displayed scope is moved to a desired position of the enlarged reproduced image by means of a direction designating button. Thereafter, a shutter button is pressed so that the image of the display scope is recorded. Reproduction zooming can be done easily without the necessity of a personal computer or the like.

2 Claims, 6 Drawing Sheets

THROUGH IMAGE DISPLAY

SETTING OF RECORDING CONDITION

REPRODUCED IMAGE DISPLAY

FUNCTION SELECTION

DIGITAL CAMERA HAVING REPRODUCTION ZOOM MODE

BACKGROUND OF THE INVENTION

1. Field of the Invention

The present invention relates to a digital camera and, more specifically, to a digital camera having a reproduction zoom mode for displaying, in enlargement, a desired area of a reproduced image.

2. Description of the Background Art

Conventionally, a digital camera is provided with a CCD (Charge Coupled Device) imager, an image memory, a liquid crystal display (hereinafter referred to as LCD) and the like. In an image pickup mode, an image picked up by the CCD imager is stored in the image memory, and in a reproducing mode, an image read from the image memory is displayed on the LCD.

When the digital camera is connected to a personal computer, it is possible to read the image data to a hard disk and then to display the image on a large display screen of a monitor, to enlarge and display a desired area of the reproduced image, or to print the displayed image.

Reproduction zooming, however, cannot be done by the conventional digital camera unless the user has a personal computer separately and is familiar with the operation of the personal computer.

SUMMARY OF THE INVENTION

Therefore, an object of the present invention is to provide a digital camera allowing reproduction zooming in a simple manner.

Briefly stated, in the present invention, in an image recorded in a recording section, an image of a zoom area designated by a designating section is read, the read image is enlarged to generate an enlarged image corresponding to one image plane, and the enlarged image is displayed and when a shutter button is pressed, the image of the zoom area is stored in the recording section. Therefore, even if the user does not have any personal computer, reproduction zooming is possible in a simple manner. Further, because the image of the zoom area is stored in the recording section, when the user wishes to view the enlarged image again, the enlarged image can be reproduced at once, without the necessity of designating the zoom scope.

Preferably, the designating section includes a magnification setting section for setting magnification of enlargement, a dimension setting section for setting dimension of the zoom area based on the set magnification, and a position setting section for setting position of the zoom area. Accordingly, the size and position of the zoom area can readily be designated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
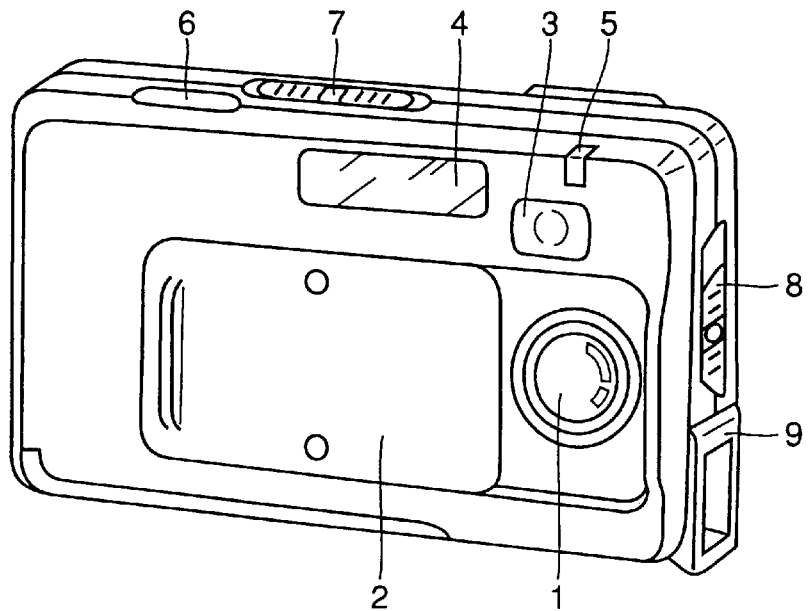
FIGS. 1A and 1B are perspective views showing an appearance of a digital camera in accordance with an embodiment of the present invention.
Figure 1B:
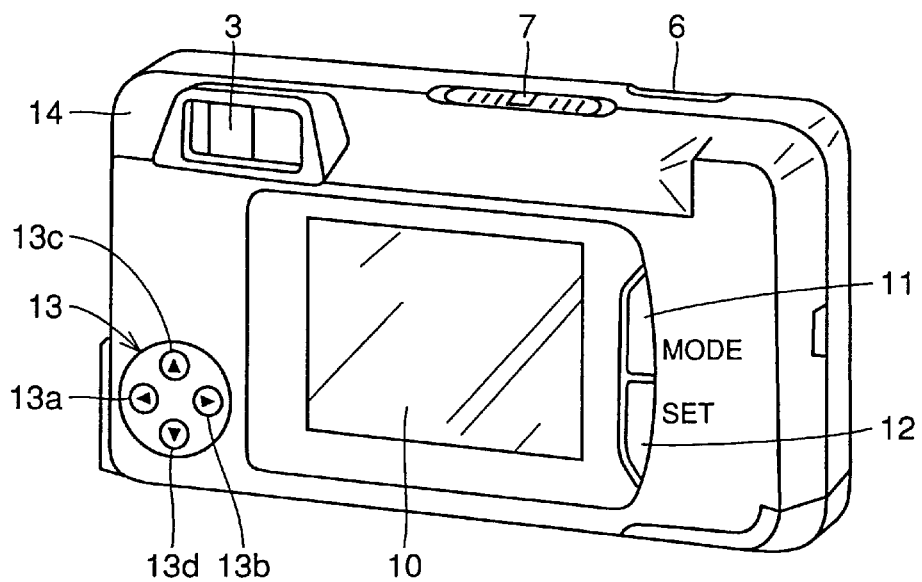

FIG. 1A is a perspective view taken from the front side (from the side of the lens) and FIG. 1B is a perspective view taken from the rear side, showing the appearance of the digital camera in accordance with the first embodiment of the present invention.

Referring to FIGS. 1A and 1B, on the front side of the digital camera, there are provided a lens 1, a lens cover 2 linked to a power switch, an optical finder 3, a flashlight 4 and an LED (Light Emitting Diode) 5 for a self timer, and on the upper and side surfaces, there are a shutter button 6, a three point type main switch 7, a macro switch lever 8 and a terminal 9. On the rear surface of the digital camera, there are provided an LCD (Liquid Crystal Display) 10, a mode button 11, a set button 12, a direction designating button 13 and a microphone 14.

Main switch 7 is used for switching among three modes, that is, an image pickup mode with LCD 10 on, an image pickup mode with LCD 10 off, and a reproduction mode. In the image pickup mode with LCD 10 on, a through image is displayed on LCD 10 and the through image is recorded. In the image pickup mode with LCD 10 off, image is picked up using optical finder 3 in the similar manner as the conventional camera using silver film. In the reproduction mode, LCD 10 is turned on and a reproduced image is displayed on LCD 10. On LCD 10, in addition to the through image and the reproduced image, various icons (characters) representing recording condition, reproduction function and so on are also displayed.

By pressing lightly each of left, right, up and down direction designating sections 13a, 13b, 13c and 13d of direction designating button 13, feeding/reversing of the reproduced image, setting of recording condition, selection of reproduction function and so on can be set.

Figure 2:
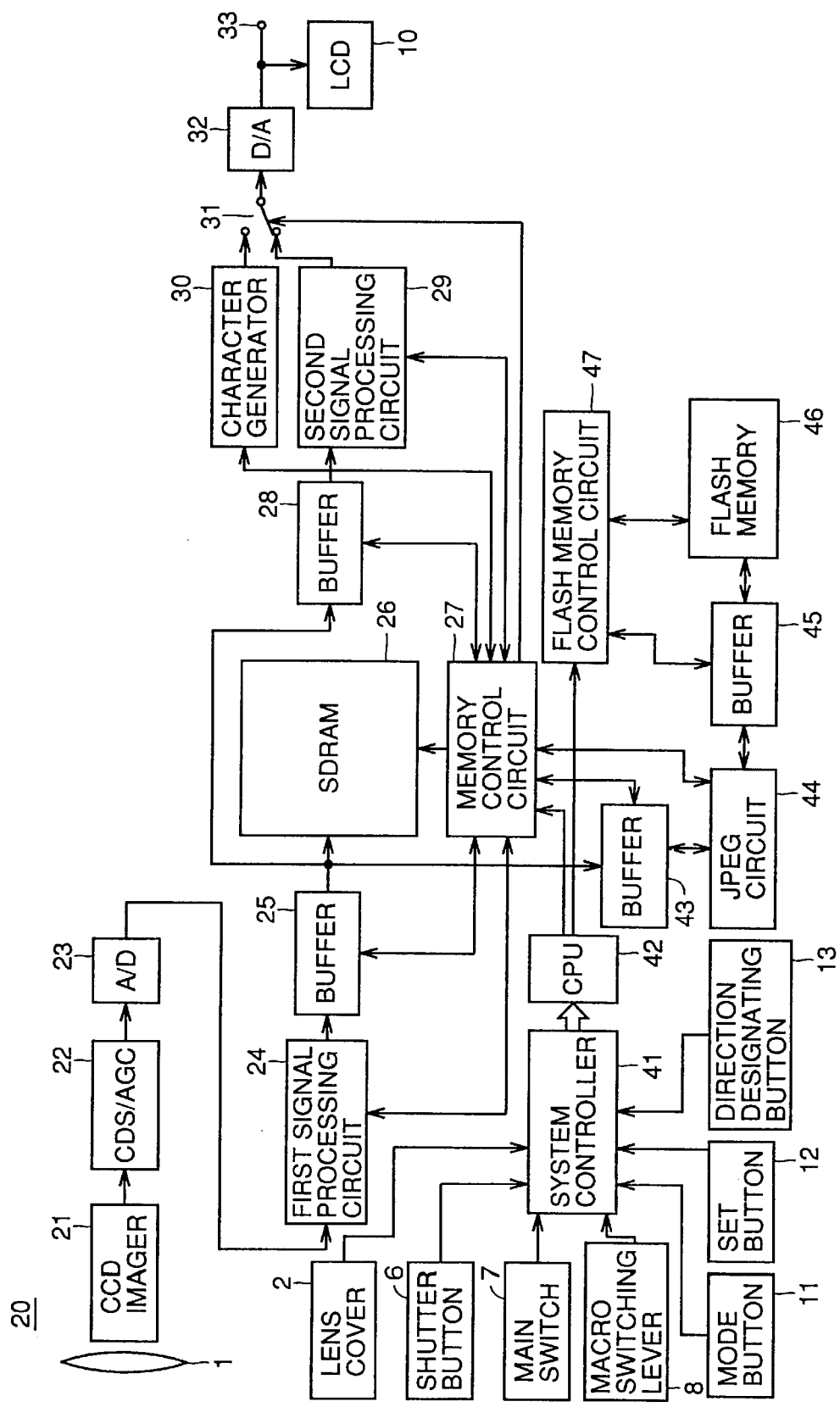
FIG. 2 is a block diagram showing a configuration of an image recording and reproducing circuit contained in the digital camera shown in FIGS. 1A and 1B.

FIG. 2 is a block diagram representing a configuration of an image recording and reproducing circuit 20 contained in the digital camera.

Referring to FIG. 2, in image recording and reproducing circuit 20, a system controller 41 applies various control signals to a CPU (Central Processing Unit) 42 at prescribed timings, in response to signals from lens cover 2, shutter button 6, main switch 7, macro switch lever 8, mode button 11, set button 12 and direction designating button 13. In accordance with the control signals applied from system controller 41, CPU 42 controls a memory control circuit 27 and a flash memory control circuit 47.

Memory control circuit 27 controls a first signal processing circuit 24, a second signal processing circuit 29, a JPEG (Joint Photographic Expert Group) circuit 44, buffers 25, 28, 43 and an SDRAM (Synchronous Dynamic random Access Memory) 26. Write/read of image data to and from SDRAM 26 are performed through buffers 25, 28 and 43. As the speed of transfer between buffers 25, 28 and 43 and SDRAM 26 (write/read) is made faster than the speed of data transfer among buffers 25, 28, 43, the first signal processing circuit 24, the second signal processing circuit 29 and JPEG circuit 44, the circuit 24, 29 and 44 can operate almost simultaneously.

Memory control circuit 27 controls a character generator 30 and a switch 31 so that a part of image data is replaced with a character image data, whereby a character image is overwritten on the through image or the reproduced image.

Flash memory control circuit 47 controls buffer 45 and flash memory 46, writes image data compressed by JPEG circuit 44 to flash memory 46 through buffer 45, and applies data read from flash memory 46 to JPEG circuit 44 through buffer 45.

In the image pickup mode, an optical image entering through lens 1 is incident on a CCD (Charge Coupled Device) imager 21 through a complementary color filter, not shown. CCD imager 21 outputs electric signals (progressive scan signals) of pixels in accordance with progressive scanning (progressive scanning of pixels). The progressive scan signals from CCD imager 21 are applied to a CDS/AGC (Correlate Double Sampling/Auto Gain Control) circuit 22.

CDS/AGC circuit performs known noise removal and level adjustment on the progressive scan signals, and the progressive scan signals which have been subjected to such processings are converted to digital data (image data) by A/D converter 23. First signal processing circuit 24 performs known white balance adjustment and gamma correction on the image data output from A/D converter 23, and thereafter, applies the image data to SDRAM 26 through buffer 25.

Memory control circuit 27 writes the image data to SDRAM 26, and thereafter reads the image data by interlace scanning. Therefore, odd-numbered field image data and even-numbered field image data are output alternately from SDRAM 26. The image data output from SDRAM 26 are input to second signal processing circuit 29 through buffer 28 and to JPG circuit 44 through buffer 43.

Figure 3A:
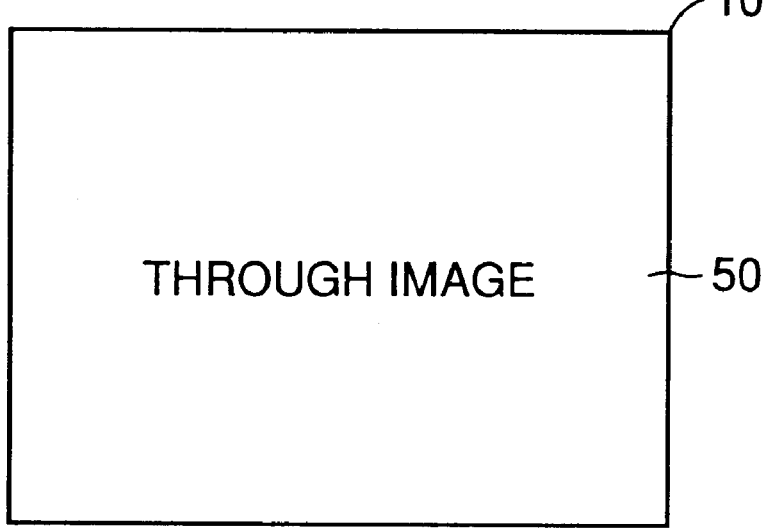
FIGS. 3A and 3B are illustrations related to an image pickup mode of the digital camera shown in FIGS. 1A and 1B.

The second signal processing circuit 29 performs processing such as color interpolation on the input image data, and image data output from second signal processing circuit 29 are applied to D/A converter 32 through switch 31. D/A converter 32 converts the image data to analog signals (image signals), which image signals are output through an output terminal 33 and applied to LCD 10. Therefore, real time motion image (through image) 50 is displayed on LCD 10, as shown in FIG. 3A.

Figure 3B:
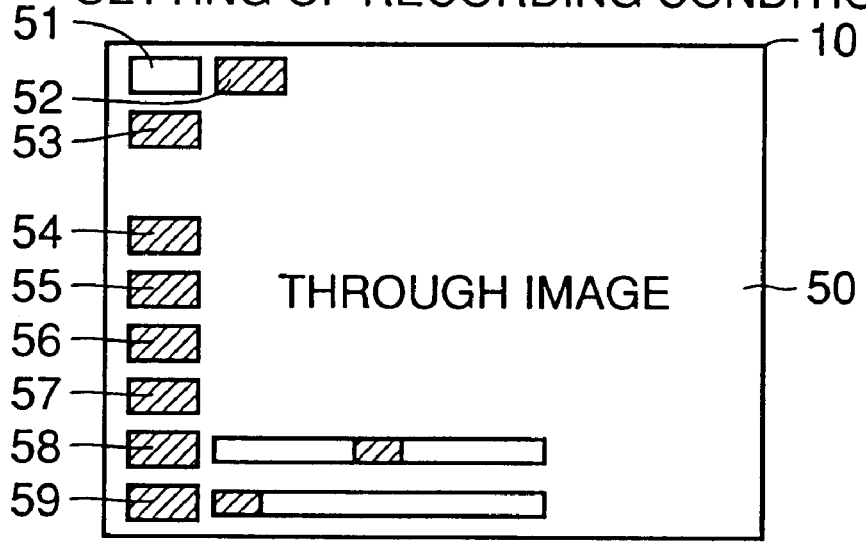

When mode button 11 is pressed in this state, various icons 51 to 59 indicating the recording condition are displayed on an end portion of LCD 10. In FIG. 3B, the icons are represented as a simple white rectangle and hatched rectangles, for simplicity of the drawing. Actually, the icons are marks representing corresponding recording conditions. Icons 51 to 59 are for setting a still image pickup mode, high speed continuous image pickup mode, resolution, voice memo, self timer, macro mode display, exposure correction and digital zooming. Icons 51 to 59 are selected by direction designating button 13. Among icons 51 to 59, the selected icon (in the figure, icon 51) is displayed in a positive state (white rectangle) and other icons are displayed in a negative state (hatched rectangles). When set button 12 is pressed in this state, the condition represented by the selected icon (in this case, icon 51) is set (in this case, still image pickup mode). When mode button 11 is pressed after the setting of recording conditions, icons 51 to 59 disappear and the display returns to the state of FIG. 3A.

When an operator presses a shutter button 6, JPEG circuit 44 is activated, image data read from SDRAM 26 and input to JPEG circuit 44 through buffer 43 are compressed in accordance with a JPEG format, and the compressed data is written to flash memory 46 through buffer 45.

In a reproduction mode, the compressed data read from flash memory 46 is input to JPEG circuit 44 through buffer 45. JPEG circuit 44 decompresses the input compressed data and applies the data to SDRAM 26 through buffer 43. Memory control circuit 27 writes the image data to SDRAM 26, and thereafter, reads the image data by interlace scanning.

Figure 4A:
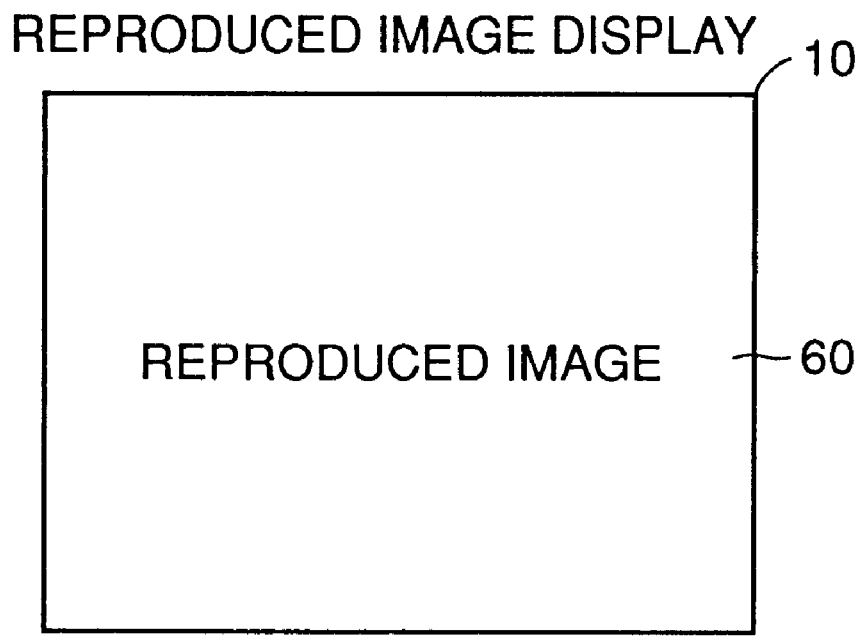
FIGS. 4A and 4B are illustrations related to the reproducing mode of the digital camera shown in FIGS. 1A and 1B.

The image data read from SDRAM 26 are applied through buffer 28, second signal processing circuit 29 and switch 31 to D/A converter 32 and converted to analog image signals. The analog image signals are output to the outside through output terminal 33 and to LCD 10. Thus, as shown in FIG. 4A, reproduced image 60 is displayed on LCD 10. When left direction designating section 13a of direction designating button 13 is pressed, an image recorded prior to the reproduced image is reproduced, and when the right direction designating section 13b is pressed, an image recorded after the reproduced image is reproduced. In this manner, a desired image can be selected and reproduced.

Figure 4B:
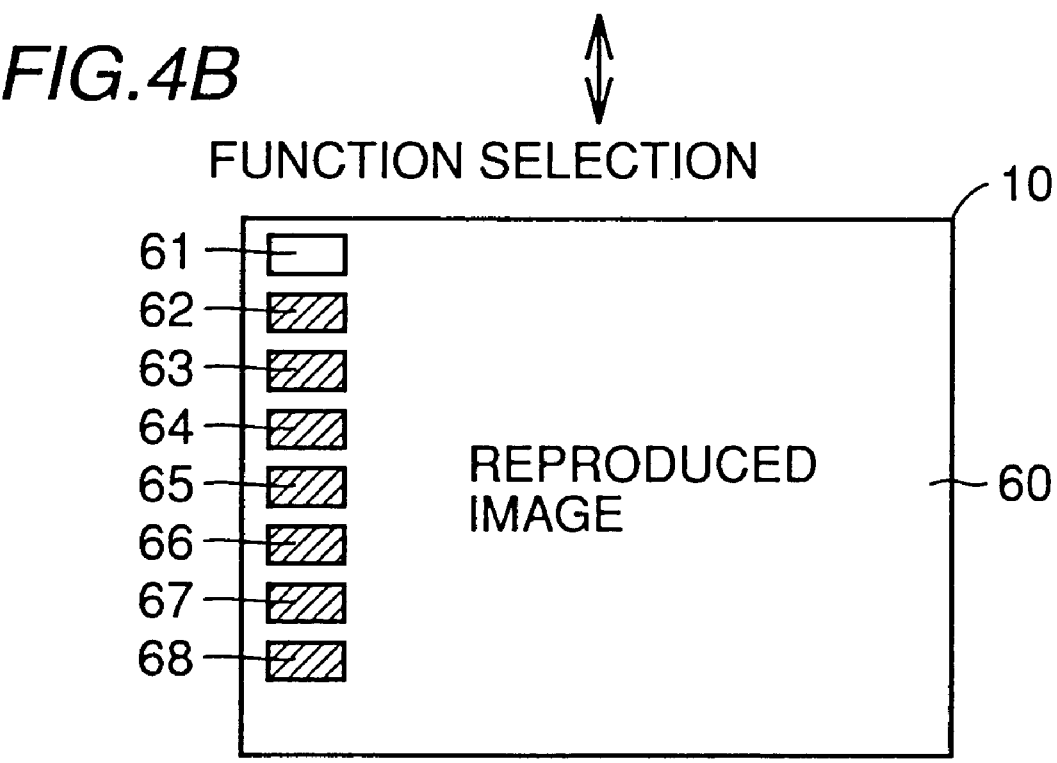

When mode button 11 is pressed in this state, various icons 61 to 68 representing reproducing functions are displayed on an end portion of LCD 10 as shown in FIG. 4B. Icons 61 to 68 are for selecting reproduction mode, multireproduction, reproduction zooming, protection, erasure, image synthesization, card operation and setting of date and time, respectively. A desired one of icons 61 to 68 is selected by direction designating button 13 and when set button 12 is pressed, the function represented by the icon is selected. When mode button 11 is pressed without pressing set button 12, the display returns to the state of FIG. 4A.

The reproduction zoom function, which is the characteristic feature of the present invention, will be described. First, in the state of FIG. 4A, reproduction image is fed/reversed by using direction designating button 13, so that a desired reproduction image 60 is selected. Thereafter, mode button 11 is pressed so that icons 61 to 68 are displayed as shown in FIG. 4B, and icon 63 of reproduction zooming is selected by using the direction designating button 13. Thus, reproduction zoom function is selected.

Figure 5:
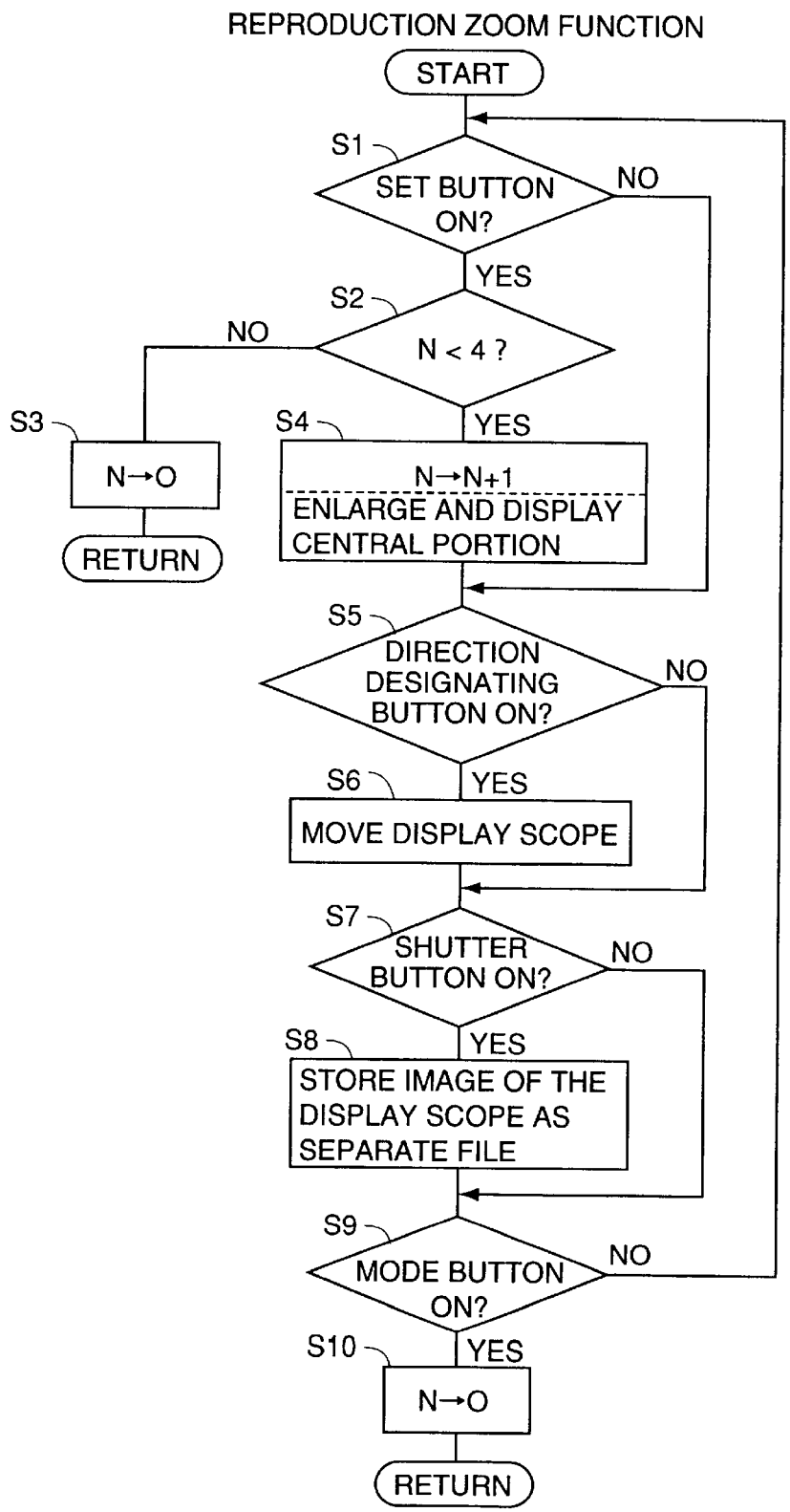
FIG. 5 is a flow chart showing image synthesizing function of the digital camera shown in FIGS. 1A and 1B.

FIG. 5 is a flow chart representing the reproduction zoom function. Referring to FIG. 5, in step S1, CPU 42 determines whether a set button 12 is pressed or not. If not, the flow proceeds to step S5, and if the button is pressed, whether the number N of enlargement is smaller than 4 or not is determined in step S2.

If N is not smaller than 4 in step S2, N is set to 0 in step S3 and the flow returns to step S1. If N is smaller than 4 (N<4) in step S2, N is incremented (+1) in step S4, and the central portion 71 of reproduced image 60 is enlarged and displayed on the full screen of LCD 10 with the magnification corresponding to the value of the number of enlargement N. When N=0, 1, 2 and 3, respectively, the original reproduced image 60 is enlarged to the magnification of 2.0, 4.0, 6.7 and 10.0, and of the original reproduced image 60 consisting of 640×480 pixels, images corresponding to 320× 240 pixels, 160×120 pixels, 96×72 pixels and 64×48 pixels are displayed in enlargement on the full screen of LCD 10.

Thereafter, in step S5, CPU 42 determines whether or not the direction designating button 13 is pressed. If the button is not pressed, the flow proceeds to step S7. If the button is pressed, the display scope is moved at a prescribed speed to the direction designated by the direction designating button 13, in step S6.

Figure 6A:
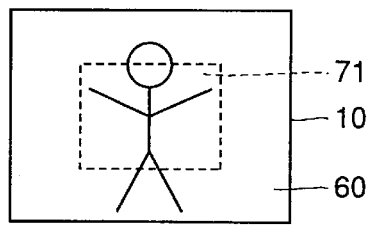
FIGS. 6A to 6C are illustrations showing the image synthesizing function of the digital camera shown in FIGS. 1A and 1B.
Figure 6B:
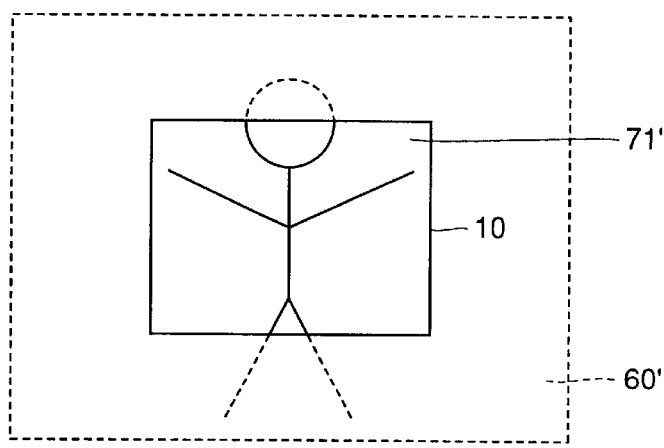
Figure 6C:
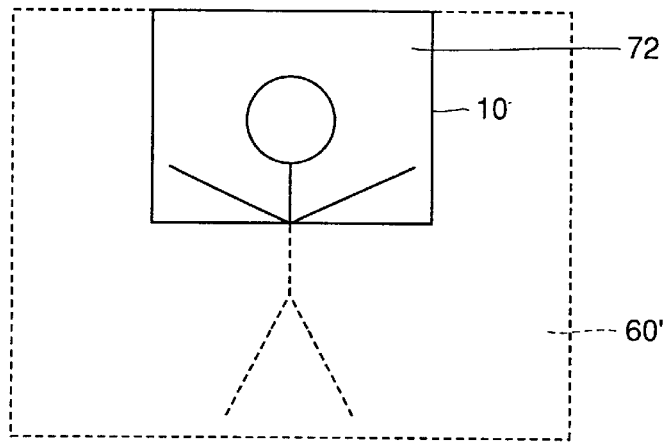

More specifically, referring to FIGS. 6A to 6C, when the central portion 71 of reproduced image 60 is enlarged and displayed on the full screen of LCD 10, it is possible to display a desired scope 72 of the enlarged reproduced image 60' on LCD 10. The operator moves the display scope 72 to a desired position in the enlarged reproduced image 60' by the direction designating button 13. At this time, in the circuit 20 shown in FIG. 2, memory control circuit 27 reads image data of only the display scope 72 of the image data of the reproduced image written to SDRAM 26 in accordance with the instruction of CPU 42, and the second signal processing circuit 29 performs interpolating processing in accordance with the magnification to generate the enlarged image.

In step S7, CPU 42 determines whether or not shutter button 6 is pressed. If not, the flow proceeds to S9, and if the shutter button is pressed, the image data of display scope 72 are stored in flash memory 46, as a separate file from the image data of the original reproduced image 60, in step S8.

When the image data are stored as a separate file, the image data corresponding to the pixels displayed in enlargement may be stored as they are, or alternatively, the number of pixels may be increased by pixel interpolation, and the image data are converted to data having a prescribed number of pixels (resolution) to be stored.

At this time, in the circuit 20 of FIG. 2, memory control circuit 27 reads only the image data of the display scope 72 of the image data written to the SDRAM 26, in accordance with the instruction from CPU 42. In response to pressing of shutter button 6, JPEG circuit 44 is activated, and the image data of the display scope 72 is stored through buffer 43, JPEG circuit 44 and buffer 45 to flash memory 46. When the image data of the display scope 72 is reproduced in the normal reproduction mode, magnification of the zoom image of the display scope 72 is automatically read by memory control circuit 27, for example, and the interpolating process in accordance with the magnification is performed by the second signal processing circuit 29, whereby the zoom image of the display scope 72 is displayed on the full screen of LCD 10.

In step S9, CPU 42 determines whether or not mode button 11 is pressed. If it is pressed, the number of enlargement N is set to 0 in step S10 and the flow returns to step S1. If the button is not pressed, the flow directly returns to step S1. In this manner, the reproduction zoom function is executed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera including an image pickup device for picking up an image, a recording device for recording the picked up image, a reproducing device for reproducing the recorded image, a storing device for temporarily storing an image to be picked up and the reproduced image, and an image display device for displaying an image read from said storing device, and having a reproduction mode for displaying a reproduced image and a reproduction zoom mode for displaying in enlargement a desired area of the reproduced image, said digital camera comprising:

a designating device for designating, in said reproduction zoom mode, a desired zoom area of the reproduced image reproduced by said reproducing device, written into said storing device and displayed on said image display device;

a first reading device for reading, from said storing device, only an image of the zoom area, designated by said designating device, of the image written into said storing device;

a first image generating device for generating an enlarged image of one image plane by enlarging the image of the zoom area read by said first reading device and providing the enlarged image to said image display device;

a writing device for writing, in response to pressing of a control button, only the image of the zoom area read by said first reading device into said recording device;

a second reading device for reading, in said reproduction mode, the image of the zoom area reproduced by said reproducing device and written into said storing device; and a second image generating device for generating an enlarged image of one image plane by enlarging the image of the zoom area read by said second reading device and providing the enlarged image to said image display device, wherein the first reading device reads only the image of the zoom area which is a part of the reproduced image reproduced by the reproducing device.

2. The digital camera according to claim 1, wherein said designating device includes:

a magnification setting device for setting magnification of enlargement;

a dimension setting device for setting dimension of said zoom area based on the magnification set by said magnification setting device; and a position setting device for setting a position of said zoom area in said reproduced image at a desired position.

* * * * *